US006801333B1

(12) United States Patent
Weiss

(10) Patent No.: US 6,801,333 B1
(45) Date of Patent: Oct. 5, 2004

(54) AUTOMATED SYSTEM FOR COMPARING A JOB QUOTE FOR A PRINT JOB WITH PRODUCTION DATA FOR AN ACTUAL PRINT JOB

(75) Inventor: Mark A. Weiss, Rydal, PA (US)

(73) Assignee: Colorquick, L.L.C., Pennsauken, NJ (US)

( * ) Notice: Subject to any disclaimer, the term of this patent is extended or adjusted under 35 U.S.C. 154(b) by 579 days.

(21) Appl. No.: 09/595,249

(22) Filed: Jun. 15, 2000

(51) Int. Cl.$^7$ ............................................. G06K 15/00
(52) U.S. Cl. ..................................... 358/1.15; 358/1.14
(58) Field of Search .................. 358/1.1–1.9, 1.11–1.18

(56) References Cited

U.S. PATENT DOCUMENTS

| | | | | |
|---|---|---|---|---|
| 4,655,135 A | * | 4/1987 | Brovman | 101/426 |
| 4,839,829 A | * | 6/1989 | Freedman | 364/519 |
| 5,570,291 A | | 10/1996 | Dudle et al. | 700/95 |
| 5,735,941 A | * | 4/1998 | Feedman et al. | 106/31.28 |
| 5,813,494 A | * | 9/1998 | Zingher | 101/494 |
| 5,826,244 A | | 10/1998 | Huberman | 705/37 |
| 5,930,810 A | | 7/1999 | Farros et al. | 707/506 |
| 5,963,641 A | * | 10/1999 | Crandall et al. | 380/2 |
| 6,018,338 A | | 1/2000 | Greulich et al. | 345/823 |
| 6,273,535 B1 | * | 8/2001 | Inoue et al. | 347/3 |
| 6,330,542 B1 | | 12/2001 | Sevcik et al. | |

FOREIGN PATENT DOCUMENTS

WO 98/08176 2/1998

\* cited by examiner

*Primary Examiner*—King Y. Poon
(74) *Attorney, Agent, or Firm*—Akin Gump Strauss Hauer & Feld LLP

(57) ABSTRACT

An automated computer-implemented scheme is provided to compare a job quote for a print job with production data for a print job that is related to the job quote. The job quote is stored in an electronic file and contains a plurality of estimate-related specifications. The production data is stored in an electronic document. In the scheme, estimate-related specifications of the job quote file are entered into a comparison engine. The estimate-related specifications include the type of printing production equipment being used for the print job. The production data file is analyzed to determine its actual print job specifications, and the actual print job specifications are then entered into the comparison engine. Then, the comparison engine compares the estimate-related specifications to the actual print job specifications, and outputs any discrepancies therebetween. Each type of printing production equipment includes a set of optimum performance parameters. The comparison engine also compares the actual print job specifications to the optimum performance parameters or to a range of optimum performance parameters for the entered printing production equipment, and outputs any actual print job specifications that are not optimum or are not in the optimum range for the entered printing production equipment. Actual print job specifications are also compared to the capabilities of the entered printing production equipment, and the comparison engine outputs any actual print job specifications that are not capable of being met by the entered printing production equipment.

44 Claims, 16 Drawing Sheets

Fill out this form with all of your Job Specs then Submit for an Instant Quote

| Submit for an Instant Quote | Cancel and return to Job Styles |
|---|---|

- Get an Instant Quote
- Review Your Active Quotes
- Select a quoted Job to Print
- Preparing Your Files
- Log Out (current user)
- Home

| My Job Type is a Flyer ||
|---|---|
| Your Project Name or ID: | Monthly ad |
| Additional Comment: | June 2000 |
| Your Group Code:<br>(if applicable - Ask Your Printer) | crw25 |
| Quantity of finished pieces: | 2000 |
| Number of unique pages: | 1 ▼ *(a page is one side of one original)* |
| Single Page Size: | 8.5 x 11 ▼ *(available sizes)* |
| Job will print: | ⊙ One-sided ○ Two-sided |
| Paper Choice: | Weyhouser Cougar Opaque Uncoated Text ▼ |
| Bleeds are where the print goes to the edge of the paper. If your document contains bleeds, please be sure to extend your images 1/8" beyond the edge of the page.<br>Do any of the pages contain Bleeds? ○ Yes ⊙ No ||
| Overall varnish is used to protect pages from scuffing, most often with gloss papers. Do you want Overall Varnish (on All pages)? ⊙ No - If Yes choose:<br>○ Dull or ○ Gloss ||
| FINISHING ||
| If your job needs to be folded, enter the Type of folds: none ▼ ||
| If your job needs to be drilled, enter Number of holes: none ▼ ||
| If your job needs to be Collated, enter number of leaves: 0 *(each sheet is a leaf - 2 pages)* ||
| Does your job require delivery in Shrink Wrapped packages? ○ Yes ⊙ No ||
| Does your job require delivery in Boxes? ⊙ Yes ○ No ||

| Submit for an Instant Quote | Cancel and return to Job Styles |
|---|---|

FIG. 3A

| Your print job as summarized below will cost: $ 257 *(Plus shipping)* To make changes and receive a revised quote, hit your back button and edit job before saving. ||
|---|---|
| Save Quote & Continue | Cancel & return to Job Styles |

| You can then Send in your file to receive a Color Proof via email. IMPORTANT: After saving, do not use your back button and save again or a duplicate record will be created Your quote can be revised at any time by clicking the "Revise Quote" button at the top of each menu. ||
|---|---|
| Job Type is a Flyer ||
| Your Project Name or ID: | Monthly ad |
| Additional Comment: | June 2000 |
| Your Group Code: | crw25 |
| Quantity of finished pieces: | 1000 |
| Number of unique pages: | 1 |
| Single Page Size: | 8.5 x 11 |
| Job will print: | One-sided |
| Paper Choice: | Weyhouser Cougar Opaque Uncoated Text |
| Bleeds | No |
| Overall Varnish | none |
| Production Equipment | Commercial Sheet-fed press |
| FINISHING ||
| Type of folds | none |
| Number of holes | 0 |
| Collating (number of leaves) | 0 |
| Shrink Wrapped Packages | No |
| Job packaged in Boxes | Yes |

| Save Quote & Continue | Cancel & return to Job Styles |
|---|---|

FIG. 3B

This is a summary of Your Job

I Want to Buy it!
Send Your File | Revise Quote | View File Check | Approve for Print | Shipping/Billing | Change Status

Details of Your Flyer - Quote Number 900

| | |
|---|---|
| Your Project Name or ID | Flyer test1 |
| Additional Comments | galaxy database |
| Your Group Code | none |
| Quote Amount (excluding shipping) | $ 1500 |
| Date Quoted | 6/7/00 11:32:17 AM |
| Approved for Printing? | No |
| Production Equipment | Commercial Sheet-fed Press |
| Times file was sent in for Proof | No file was sent in yet |
| File Check Results | No file was sent in yet |
| Quantity of Finished Pieces | 1000 |
| Number of Unique Pages | 1 |
| Single Page Size | 8.5 x 11 |
| Job will print | One-sided |
| Text Stock | Seth CQ_testWeyhouser Cougar Opaque Uncoated Text |
| Are there Bleeds? | No |
| Will Job be Shrink Wrapped? | No |
| Will Job be Boxed? | Yes |
| Is Quote Still Active? | Yes |

Back to your Job List

Get an Instant Quote | Review Your Existing Quotes | Select a quoted Job to Print | Preparing Your Files | Log Out (current user) | Home

FIG. 3D

| We're sorry, but because of discrepencies between the file you sent and the job specs (see the File Check results below), we have temporarily held back this file. Please choose from the following options: |
| Send a corrected file | Revise Specs to match file |
| Back to Job 901 Summary |

Preflight (file check) Results for your Job Number 901
Number of Pages Specified in your Job Quote = 1
Page Size Specified in your Job Quote = 8.50 x 11.00

The page size in your file = 8.5 inches x 11 inches
The job quote matches the file you sent.
The number of pages in your file = 2
The number of Pages quoted does not match the file sent in.
You will need to correct your file and send it in again,
or change the number of pages in your quote and get a revised price.

Fonts found in your file:
* BHBEOJ+VAGRounded-Light-OV-GMYDXA
* BHBFBA+Frutiger-Roman-OV-HMYDXA
* BHBFCG+Helvetica-OV-IMYDXA
* BHBFHN+Futura-Book-OV-KMYDXA

Spot Colors found in your file (whether used or not):
* SpringBackground (C: 10% M: 10% Y: 43% K: 0%)
* SpringGreen (C: 83% M: 0% Y: 75% K: 0%)
* BHBEOJ+VAGRounded-Light-OV-GMYDXA
* BHBFBA+Frutiger-Roman-OV-HMYDXA
* BHBFCG+Helvetica-OV-IMYDXA
* BHBFHN+Futura-Book-OV-KMYDXA
* SpringBackground (C: 10% M: 10% Y: 43% K: 0%)
* SpringGreen (C: 83% M: 0% Y: 75% K: 0%)
* BHBEOJ+VAGRounded-Light-OV-GMYDXA
* BHBFBA+Frutiger-Roman-OV-HMYDXA
* BHBFCG+Helvetica-OV-IMYDXA
* BHBFHN+Futura-Book-OV-KMYDXA
* SpringBackground (C: 10% M: 10% Y: 43% K: 0%)
* SpringGreen (C: 83% M: 0% Y: 75% K: 0%)

Please note:
All spot colors have been converted to process colors (CMYK)
which can sometimes have unpredictable results if the spot colors
were built in RGB (red, green, blue). Please check your
Color PDF Proof to see if the results are acceptable.

Other Possible Concerns:
Page 1 (Image18): CMYK total area coverage (TAC) too high (365% > 300%)
Page 1 (Image18): Resolution of color image is too low
Page 1 (Image18): CMYK total area coverage (TAC) too high (365% > 300%)
Page 1 (Image18): Resolution of color image is too low
Page 1 (Image18): CMYK total area coverage (TAC) too high (365% > 300%)

FIG. 4A

| Your File Check Report has recommendations to improve your resulting print job. |
| The next step is to choose from the following options: |

| Approve proof as is | Revise Job Specs to match file |
| Send in a corrected file | Back to Job 901 Summary |

Preflight (file check) Results for your Job Number 901
Number of Pages Specified in your Job Quote = 2
Page Size Specified in your Job Quote = 8.50 x 11.00

The page size in your file = 8.5 inches x 11 inches
The job quote matches the file you sent.
The number of pages in your file = 2
The job quote matches the file you sent.

Fonts found in your file:
* BHBEOJ+VAGRounded-Light-OV-GMYDXA
* BHBFBA+Frutiger-Roman-OV-HMYDXA
* BHBFCG+Helvetica-OV-IMYDXA
* BHBFHN+Futura-Book-OV-KMYDXA

Spot Colors found in your file (whether used or not):
* SpringBackground (C: 10% M: 10% Y: 43% K: 0%)
* SpringGreen (C: 83% M: 0% Y: 75% K: 0%)
* BHBEOJ+VAGRounded-Light-OV-GMYDXA
* BHBFBA+Frutiger-Roman-OV-HMYDXA
* BHBFCG+Helvetica-OV-IMYDXA
* BHBFHN+Futura-Book-OV-KMYDXA
* SpringBackground (C: 10% M: 10% Y: 43% K: 0%)
* SpringGreen (C: 83% M: 0% Y: 75% K: 0%)
* BHBEOJ+VAGRounded-Light-OV-GMYDXA
* BHBFBA+Frutiger-Roman-OV-HMYDXA
* BHBFCG+Helvetica-OV-IMYDXA
* BHBFHN+Futura-Book-OV-KMYDXA
* SpringBackground (C: 10% M: 10% Y: 43% K: 0%)
* SpringGreen (C: 83% M: 0% Y: 75% K: 0%)

Please note:
All spot colors have been converted to process colors (CMYK)
which can sometimes have unpredictable results if the spot colors
were built in RGB (red, green, blue). Please check your
Color PDF Proof to see if the results are acceptable.

Other Possible Concerns:
Page 1 (Image18): CMYK total area coverage (TAC) too high (365% > 300%)
Page 1 (Image18): Resolution of color image is too low
Page 1 (Image18): CMYK total area coverage (TAC) too high (365% > 300%)
Page 1 (Image18): Resolution of color image is too low
Page 1 (Image18): CMYK total area coverage (TAC) too high (365% > 300%)
Page 1 (Image18): Resolution of color image is too low

| Manufacturing Table: | | The data in this table is generated by the Quote Engine. This table contains information about the electronic document that is needed in order to manufacture it. Some information is taken directly from the quote, other information is computed by comparing selections made in the quote with predefined product information. Several records in this table may be utilized in order to define the manufactuing requirements of a single quoted product. | |
|---|---|---|---|
| Field Name | Data Type | Sample Data | Description |
| Bleeds | Boolean | TRUE | The image extends to the edge of the document |
| ColorsBack | Number | 4 | Number of colors on the back of the document |
| ColorsFront | Number | 4 | Number of colors on the front of the document |
| Component | Number | | Component number is used internally by the estimating engine to keep track of multiple components of a document |
| ComponentFlats | Number | | |
| CutCharge | Number | | |
| CutCuts | Number | | |
| CutHours | Number | | |
| CutLifts | Number | | |
| Description | Text | | |
| DrillCharge | Number | | |
| DrillHours | Number | | |
| DrillLifts | Number | | |
| ErrorCode | Number | | |
| FlatsAcross | Number | | |
| FlatSizeLen | Number | | |
| FlatSizeWidth | Number | | |
| FlatsPerForm | Number | | |
| FlatsUp | Number | | |
| FoldingCountIn | Number | | |
| FoldingCountOut | Number | | |
| FoldingMakereadyCharge | Number | | |
| FoldingMakeReadyHours | Number | | |
| FoldingRunCharge | Number | | |
| FoldingRunHours | Number | | |
| FoldStyle | Number | | |
| Forms | Number | | |
| Layout | Number | | |
| NumberofFlats | Number | | |
| NumberofPlates | Number | | |
| PaperCharge | Number | | |
| PaperID | Number | | |
| PaperLength | Number | | |
| PaperWidth | Number | | |
| Pass | Number | | |
| PlateCharge | Number | | |
| PressCountIn | Number | | |
| PressCountOut | Number | | |
| PressID | Number | 151 | Production Equipment Identifier (Commercial Sheet-fed Press) |
| PressImpressions | Number | | |
| PressMakereadyCharge | Number | | |
| PressMakeReadyHours | Number | | |
| PressRotate | Boolean | | |
| PressRunCharge | Number | | |
| PressRunHours | Number | | |
| PressWashupCharge | Number | | |
| PressWashupHours | Number | | |
| PrinterID | Number | | |
| QuoteNum | Number | | |
| ShrinkWrapCharge | Number | | |
| ShrinkWrapHours | Number | | |

FIG. 5-2

| Field Name | Data Type | Sample Data | Description |
|---|---|---|---|
| StitcherCountIn | Number | | |
| StitcherCountOut | Number | | |
| StitcherCoverFeeder | Number | | |
| StitcherMakereadyCharge | Number | | |
| StitcherMakereadyHours | Number | | |
| StitcherPockets | Number | | |
| StitcherRunCharge | Number | | |
| StitcherRunHours | Number | | |
| TotalCharges | Number | | |
| TwoSided | Boolean | | |
| WorkTurnForm | Boolean | | |
| Quote Table: | This table contains quote information specified by the client and additional information calculated by the Quote Engine. The data in this table describes the overall product at a higher level and with less detail than the manufacturing table. | | |
| Field Name | Data Type | Sample Data | Description |
| Binding | Boolean | | |
| Bleeds | Boolean | | |
| Boxing | Boolean | | |
| Collating | Boolean | | |
| ColorsBackCover | Number | | |
| ColorsBackText | Number | | |
| ColorsFrontCover | Number | | |
| ColorsFrontText | Number | | |
| Coverage | Number | | |
| DrillHoles | Number | | |
| Drilling | Boolean | | |
| FlatSizeLen | Number | | |
| FlatSizeWid | Number | | |
| FoldStyle | Number | | |
| GroupCode | Text | | |
| NumberofFlats | Number | | |
| PageLength | Number | | |
| Pages | Number | | |
| PagesPerFlat | Number | | |
| PageWidth | Number | | |
| PaperIDCover | Number | | |
| PaperIDText | Number | | |
| PrinterID | Number | | |
| ProductID | Number | | |
| ProjectNum | Number | | |
| Quantity | Number | | |
| QuoteNum | Number | | |
| SelfCover | Boolean | | |
| Shrinkwrap | Boolean | | |
| ShrinkWrapQty | Number | | |
| TwoSided | Number | | |
| VarnishBackCover | Boolean | | |
| VarnishBackText | Boolean | | |
| VarnishFrontCover | Boolean | | |
| VarnishFrontText | Boolean | | |
| Comparison Engine Messages: | The comparison engine uses data from this table in order to interpret messages from the Preflight Software. The status field determines how the logic flows in the comparison engine when a matching message is received from the Preflight Software. Many messages are compared to the quote; for example: number of pages and number of colors. Many messages are compared to production equipment requirements as well; the device-dependent RGB message is an example that requires comparison to production equipment capabilities and quote information. | | |
| Field Name | Data Type | Sample Data | Description |
| Message | Text | Device-dependent RGB | Message From Preflight Software |

FIG. 5-3

| | | Electronic Document contains an RGB (red, green, blue) image | Translation of message from Preflight Software |
|---|---|---|---|
| Translation | Text | | |
| Suggestion | Text | RGB images should be converted to CMYK mode for better results | Suggested action concerning message |
| Status | Number | | Status of automated comparison: 0 = OK, 1 = Alert, 2 = Warning, 3 = Major Problem |
| | | | 1 |
| Finishing Table: | | The Finishing table contains information about production equipment other than for printing. | |
| Field Name | Data Type | Sample Data | Description |
| BoxChargePerCarton | Number | | |
| CutterChargePerHour | Number | | |
| CutterLiftInches | Number | | |
| CutterLiftsPerHour | Number | | |
| DrillChargePerHour | Number | | |
| DrillLiftInches | Number | | |
| DrillLiftsPerHour | Number | | |
| DrillSpindles | Number | | |
| FolderRunChargePerHour | Number | | |
| FolderRunSheetsPerHourCover | Number | | |
| FolderRunSheetsPerHourHeavyText | Number | | |
| FolderRunSheetsPerHourText | Number | | |
| FolderRunWastePct | Number | | |
| FolderSetupChargePerHour | Number | | |
| FolderSetupMinutesParallel | Number | | |
| FolderSetupMinutesRtAngle | Number | | |
| FolderSetupSheetsParallel | Number | | |
| FolderSetupSheetsRtAngle | Number | | |
| PrinterID | Number | | |
| ShrinkWrapChargePerHour | Number | | |
| ShrinkWrapPacksPerHour | Number | | |
| StitcherCoverFeeder | Boolean | | |
| StitcherNumPockets | Number | | |
| StitcherPiecesPerHour1Pocket | Number | | |
| StitcherPiecesPerHour2Pocket | Number | | |
| StitcherPiecesPerHour3Pocket | Number | | |
| StitcherPiecesPerHour4Pocket | Number | | |
| StitcherPiecesPerHour5Pocket | Number | | |
| StitcherPiecesPerHour6Pocket | Number | | |
| StitcherRunChargePerHour | Number | | |
| StitcherRunWastePct | Number | | |
| StitcherSetupChargePerHour | Number | | |
| StitcherSetupMinutesCoverFeeder | Number | | |
| StitcherSetupMinutesGeneral | Number | | |
| StitcherSetupMinutesPerPocket | Number | | |
| | | | |
| Press Table: | | This table contains information related to print production equipment. | |
| Field Name | Data Type | Sample Data | Description |
| ColorBarInches | Number | | |
| GripperInches | Number | | |
| ImpPerHour | Number | | |
| MRSheetsPerColor | Number | | |
| Perfecting | Boolean | | |
| PlatePrice | Number | | |
| PressColors | Number | | |
| PressID | Number | 151 | Commercial Sheet-fed Press |
| PressLength | Number | | |
| PressRateMR | Number | | |
| PressRateRun | Number | | |
| PressWidth | Number | | |
| PrinterID | Number | | |
| RunWastePct | Number | | |

FIG. 5-4

| SetupMinutes | Number | | |
|---|---|---|---|
| SideGuideInches | Number | | |
| WashupMinutes | Number | | |

AUTOMATED SYSTEM FOR COMPARING A JOB QUOTE FOR A PRINT JOB WITH PRODUCTION DATA FOR AN ACTUAL PRINT JOB

BACKGROUND OF THE INVENTION

The present invention relates to the printing job workflow management process.

The printing industry is rapidly adopting automated workflow processes, including processes that allow customers to electronically obtain print job estimates and to electronically submit print jobs. The Internet has accelerated this process by allowing users to request and receive print job estimates, and to submit print jobs to printing company web sites, via a browser.

In a typical process, the customer inputs print job specifications via a browser interface provided by a printing company and receives a job quote, including a cost estimate, based on the specifications. A print job identification number is assigned to the job quote and is stored in the company's server. If, or when, the customer wishes to proceed with the print job, the customer electronically submits the print job by uploading an electronic document containing production data (i.e., the print job), along with the print job identification number, to the company. The printing company receives the electronic document and then immediately proceeds to process the print job. Alternatively, the printing company may retrieve the job quote from its server before proceeding to process the print job.

A common problem that occurs in this automated process is that one or more specifications in the job quote do not match the actual specifications of the print job. This may be due to a change made by the customer from the time when the customer requested the job quote to the time when the final production data was generated. This may also be due to a misunderstanding by the customer of what specifications should have been entered for a print job when the job quote was requested. Regardless of the reasons for any discrepancies, the result is that the customer's cost estimate is either too high or too low for the customer's actual print job. Three scenarios are possible when such discrepancies occur.

First, the printing company may be aware of the discrepancy and will decide to perform the print job for the quoted price, thereby either incurring a loss of expected profit margin if the cost of the actual job is greater than the cost estimate, or benefiting from a higher than expected profit margin if the cost of the actual job is less than the cost estimate. Neither situation is ideal because one of the parties will not receive the proper or expected value for their money or services.

Second, the printing company may be unaware of the discrepancy and will perform the print job for the quoted price. If the printing company discovers the discrepancy before the customer is invoiced, the printing company faces the same choices as described above. If the printing company never discovers the discrepancy, the printing company will lose some control over its business model since expected revenue may not match expected expenses.

Third, the printing company may be aware of the discrepancy and may decide to contact the customer to discuss the discrepancy. Such manual intervention is inefficient and adds additional time to the process.

Other problems occur in such automated printing processes. For example, a job quote may be based upon the use of a particular type of printing production equipment but the actual print job may not be optimized for that type of equipment. Thus, while the print job can be completed, the quality will not be as good as the equipment can provide. This type of problem is not automatically flagged by printing companies that accept electronic production data since conventional preflight software will not identify this problem.

Yet another problem is that the actual print job may not even be able to be performed by the type of printing production equipment described in the job quote specifications. Conventional preflight software will not automatically identify this problem. Manual user input is required to identify the type of printing production equipment before preflight software can perform this function.

Despite the large number of printing companies that do business over the Internet and other electronic networks, there are no known schemes that automatically compare job quotes with production data and identify any discrepancies, illegal parameters, un-optimized production data, and the like. The present invention provides such a scheme.

SUMMARY OF THE INVENTION

A first embodiment of the present invention provides an automated computer-implemented method of comparing a job quote for a print job with production data for a print job that is related to the job quote. The job quote is stored in an electronic file and contains a plurality of estimate-related specifications. The production data is stored in an electronic document. In the method, the estimate-related specifications of the job quote file are entered into a comparison engine. The production data file is analyzed to determine its actual specifications, and at least some of the actual print job specifications are entered into the comparison engine. Next, the comparison engine compares the estimate-related specifications to the actual print job specifications, and outputs any discrepancies therebetween.

Examples of discrepancies include: the number of pages in the estimate-related specifications do not match the number of pages in the actual print job specifications; the number of colors in the estimate-related specifications do not match the number of colors in the actual print job specifications; the size of the pages in the estimate-related specifications do not match the size of the pages in the actual print job specifications; the bleeds in the estimate-related specifications do not match the bleeds in the actual print job specifications; and, the ink coverage in the estimate-related specifications do not match the ink coverage in the actual print job specifications.

Discrepancies may fall into the categories of an "alert," "a warning," and a "major problem." An alert type discrepancy is addressable without any input by a human operator and is thus automatically addressed via print control process software, and without any input by the human operator. A warning type discrepancy must be addressed by human operator input. If a warning type discrepancy occurs, a plurality of selectable printing job-related choices are displayed at a workstation and a human operator inputs one of the selectable choices via the workstation. The warning type discrepancy is then automatically addressed via print control process software by using the choice selected by the operator without any further input by the human operator. A major problem discrepancy cannot be resolved automatically or by human operator input using the existing job quote and production data. If a major problem type discrepancy occurs, an electronic job quote process may be initiated to allow a revised job quote to be prepared that addresses the major problem type discrepancy. Alternatively, instructions are communicated to an operator via a workstation display to prepare a revised production data file that addresses any identified major problem type discrepancy.

In another embodiment of the present invention, one of the estimate-related specifications includes the type of printing production equipment being used for the print job, wherein each type of printing production equipment includes a set of optimum performance parameters. In this embodiment, the specification of the type of printing production equipment being used for the print job is entered into the comparison engine. The comparison engine then compares the actual print job specifications to the optimum performance parameters or to a range of optimum performance parameters for the entered printing production equipment, and outputs any actual print job specifications that are not optimum or are not in the optimum range for the entered printing production equipment. In one optimization checking process, the resolution of the actual print job is compared to the optimum resolution or to an optimum range of resolutions for the entered printing production equipment, and a signal is output if the actual resolution of the print job is not optimum or is not in an optimum range for the entered printing production equipment.

In yet another embodiment of the present invention, the comparison engine compares the actual print job specifications to the capabilities of the entered printing production equipment, and outputs any actual print job specifications that are not capable of being met by the entered printing production equipment.

The analysis of the production data file to determine its actual specifications may be performed by using preflight software.

BRIEF DESCRIPTION OF THE DRAWINGS

FIGS. 3A–3D are sample user input and display screens associated with some of the flowchart steps in FIGS. 1A–1E;

FIGS. 4A and 4B are sample user input and display screens associated with the print job comparison/checking process of the present invention; and FIG. 5 (broken up into parts 1–4) shows the data objects used in the job quote process, the comparison/checking process, and the print production process for performing print jobs in accordance with the present invention.

DETAILED DESCRIPTION OF THE INVENTION

Figure 1A:
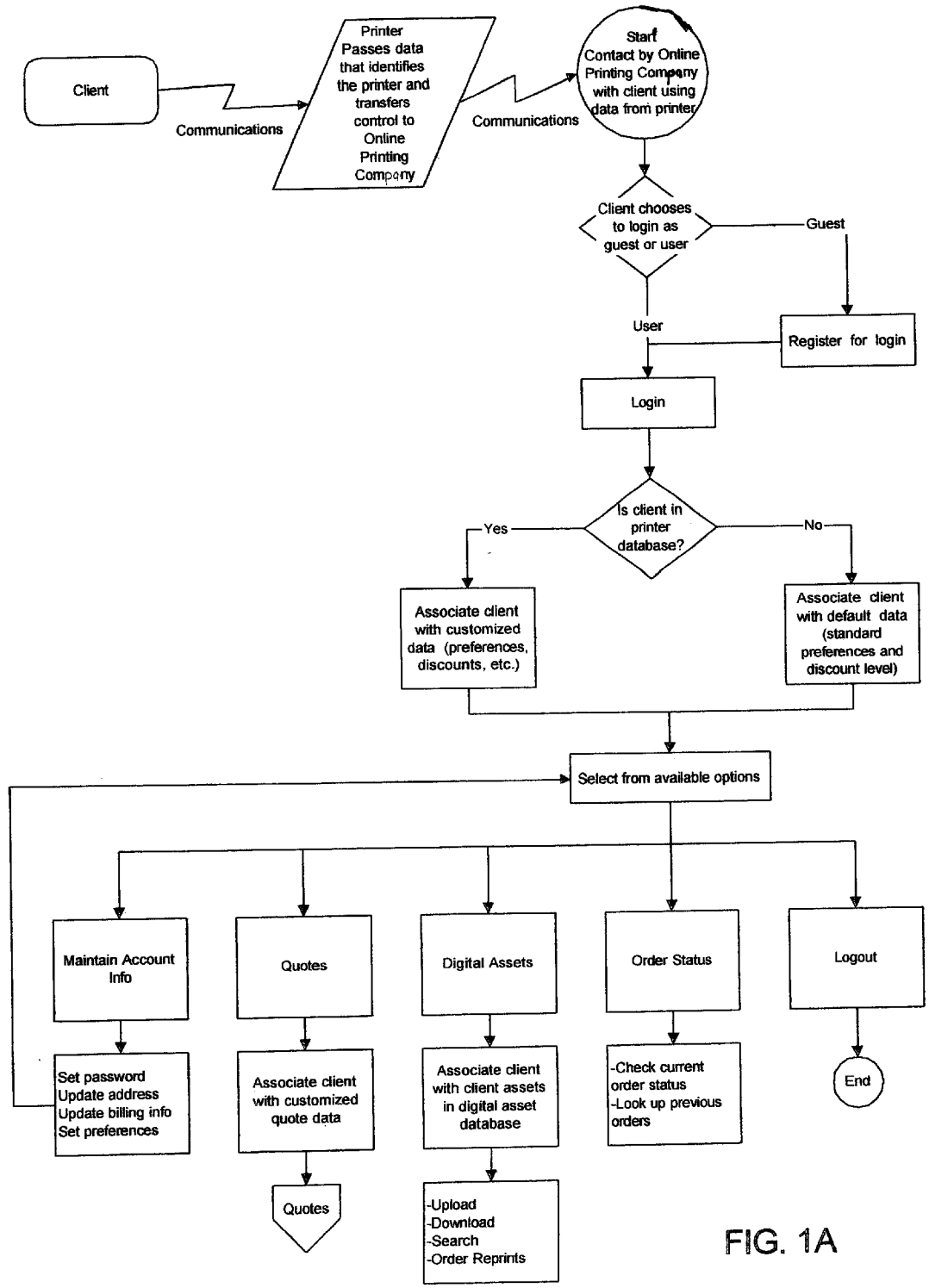
FIGS. 1A–1E are functional flowcharts of the steps in the process of one preferred embodiment of the present invention.

Certain terminology is used herein for convenience only and is not to be taken as a limitation on the present invention. In the drawings, the same reference letters are employed for designating the same elements throughout the several figures.

DEFINITIONS production data or production file—This is the actual contents that a client (also, referred to interchangably throughout the application as an "operator") wishes to have printed. It is electronically stored in an electronic document, such as a PDF file or a file that can be converted into a PDF file.

electronic document—an electronic form of a document. The document itself may be an image, a graphical layout of ASCII text, an enhanced format document such as a web page, or a compound or multimedia document. The electronic document is typically stored as a graphical file.

job quote—This defines a plurality of specifications that describe the desired print job. The specifications are stored in an electronic file. The job quote typically includes an estimate of the total cost of the print job. The job quote implicitly contains criteria (agreed upon by the user/client and service/product provider) to which the production file must conform so that an automated production process creates the desired outcome.

print job—This is the product desired by the client which may be described by its specifications (i.e., the job quote), or by its actual contents (i.e, the production data or production file). The print jobs that are within the scope of the present invention include conventional stand-alone print jobs, such as single printed sheets, business cards, envelopes, booklets, and the like, as well as print jobs that are parts of larger printing processes, such as portions of magazines, newpapers, web distributed digital content.

ACRONYMS

Figure 2:
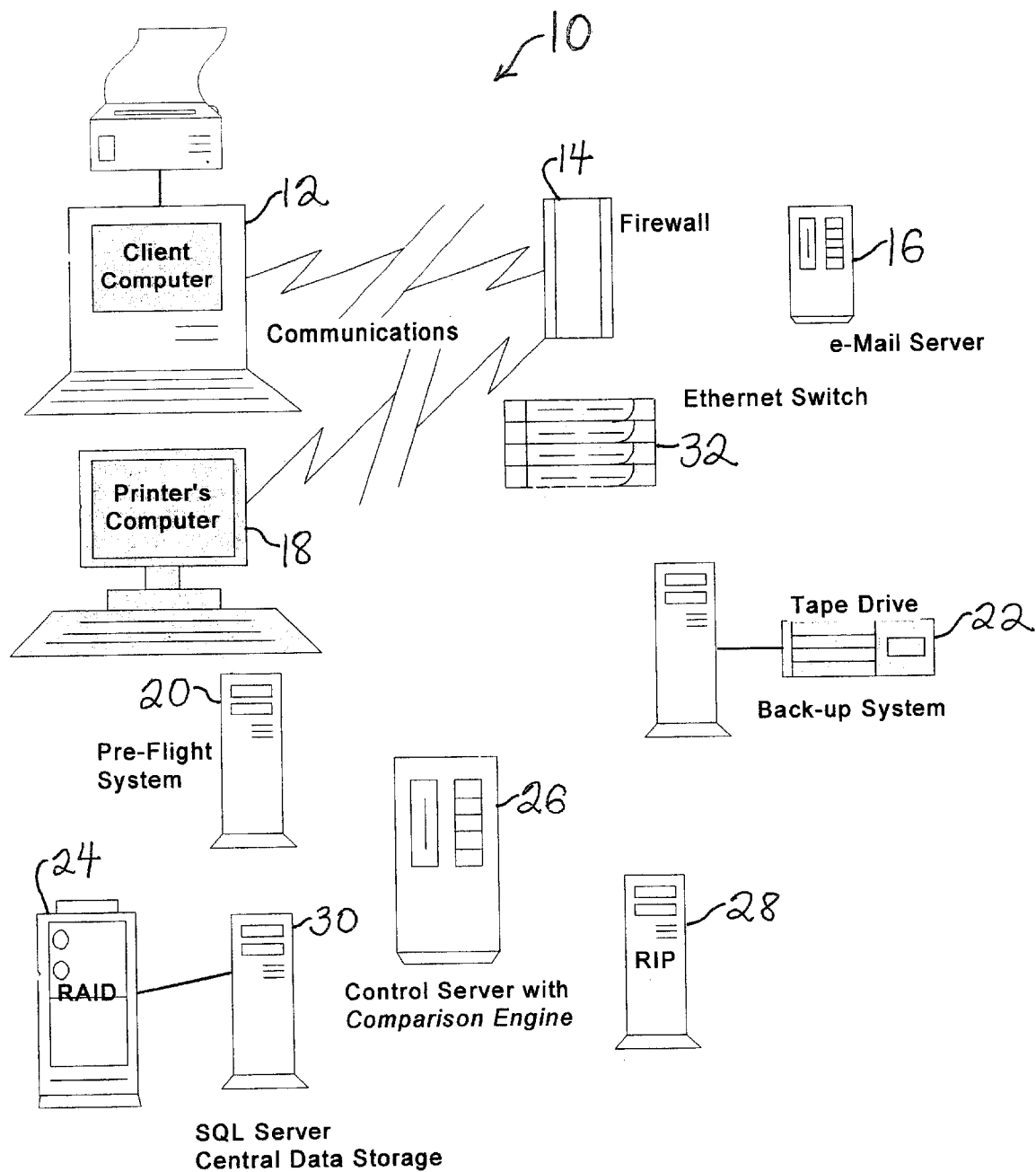
FIG. 2 is a high-level hardware architecture block diagram configuration for one preferred embodiment of the present invention.

PDF—Portable Document Format (Adobe)
PS—PostScript
PPD—PostScript Printer Definition
CT—continuous tone (as in "Linework/CT")(SCITEX file format)
XML—Extensible Markup Language
RIP—raster image processor (FIG. 2 only)

The present invention is described in the context of a system provided by a company that administers an automated printing process via an electronic network, such as the Internet. The administering company is referred to herein as an "online printing company," and the system is referred to as an "online printing system."

The online printing system allows for the automated comparison of print quote specifications, usually used to generate the price to reproduce a custom document, with the actual graphical production data provided for reproduction. As discussed above, discrepancies between quote specifications and production data are commonplace. In a totally automated workflow process, there is a very high likelihood of producing work that the client did not order or does not wish to pay for, unless there are automated checks to ensure agreement between the two data streams.

The online printing system of the present invention accepts specifications from a quote/proposal system, collects data from a preflight system (or another type of system that determines actual specifications from an analysis of a production data file), and then compares the information to ensure that it is consistent. In addition, information about an individual printer's quality and production requirements is also checked to ensure that these standards are adhered to. Major items that are checked include the following items:

1. Number of pages in a document.
2. The size of the pages.
3. The number of colors. There is no consistent naming convention for colors. Thus, a logo created in Adobe Illustrator using the colors black and PMS 285 will actually create another color when placed in a Quark Express document with black and PMS 285 because there is no agreement on how PMS 285 is named.
4. Spot or process color.
5. Resolution of graphic data provided. This must be checked against the imaging device that the quote was based upon. The resolution requirements change with different imaging technology, but should be met to ensure quality reproduction.

6. Bleed specifications.

7. Ink coverage issues. There are limits to the amount of ink (or toner) that can be put on different substrates. Furthermore, some ink can be very expensive. Thus, coverage is usually estimated as light, medium or heavy in preparing the estimate. Disagreements on this point could change production costs significantly, and should be agreed upon prior to a project being imaged.

If a problem is identified, one of three types of responses will be generated, as follows:

1. Alert—This is a small discrepancy that can be automatically corrected without substantially changing the design or quality of the product. The correction is made and the client is alerted to look for the change on his proof. Examples of alerts include missing fonts, color naming, and conversion of RGB to CMYK images.

2. Warning—This is a more significant discrepancy and does not result in automatic correction. Instead, the client is notified of the discrepancy and is given possible suggestions as to how the situation might be resolved. The notification and resolution options may occur via e-mail or by client interaction via a browser with a web site of the online printing company. The client chooses a solution, or resubmits the quote specification, production data, or both to resolve the disagreement. Examples of warnings include discrepancies in page size, bleeds or ink coverage, color mapping problems, and resolution issues.

3. Major Problem—The discrepancy is described and presented to the client. However, the only solution is for the client to correct the quote and/or change and resubmit the production data.

Consider the following example: A client wants an eight page 8½×11 booklet, sprinted in four color process, at a quantity of 500. The client uses the quote engine of the online printing company to obtain a job estimate, obtains a satisfactory price, and agrees to purchase the product. The client asks a designer at the client's company to submit a production file. The designer uploads a document that has nine pages, with some RGB images taken with a digital camera at the lowest resolution, and a page size of 9½×12. (The designer made the pages larger so that the crop marks would be visible.) In the absence of the automated checking system in the present invention, an automated production system would most likely reproduce the booklet incorrectly. Perhaps the first eight pages would be reproduced. Or, a twelve page booklet would result because in a saddle-stitch booklet, pages must be in series of four (a front left and right, and a back left and right) so it is not possible to have four more pages without having three blank pages. Page size and cropping would also be possible issues that might cause a discrepancy between what the client estimated and what the client actually wants and gets. When the printing job is done, additional issues are raised as to what the client's invoice should be, since the work done does not reflect the work requested in the quote.

The present invention eliminates these problems by automatically communicating potential problems with the client, and in some cases, requiring client resolution prior to releasing the digital information to proceed in an automated production environment. In the above example, the client would have been alerted to the differences between the production data submitted by the client's designer, and the booklet specifications originally submitted for the estimate. In addition, the RGB (three-color) images would have been converted to process color and the client would have been alerted to this fact. Also, the resolution of the images would have been checked against the printer's quality requirements. If the job was quoted to be reproduced digitally, then the low resolution graphics would probably be acceptable. However, if the printer estimated the job and committed to using offset lithography, then higher resolution graphics may be required and the client would have been notified of this fact and would have been given an opportunity to resubmit a higher resolution image before the print job was fulfilled. Of course, the client may have chosen to go forward with the originally submitted low resolution graphics, but at least the client would not be surprised at the resolution when the final print job is received.

In the above example, the page size discrepancy would generate a "Warning," with some options to fix it. However, disagreement in the number of pages would be a "Major Problem" which would have to be resolved prior to the work progressing.

In sum, the use of an intelligent checking system that actively compares quote specifications to production data and producer requirements eliminates costly wasted time and materials, and ensures that the clients receive the products that they desire. In addition, it guarantees that the producer has the digital material needed to consistently provide a high quality product that matches client specifications. Lacking this system, early stage human intervention into an automated workflow would be required. This would effectively eliminate the time and economic benefits of an automated system.

FIGS. 1A–1E are functional flowcharts of the steps in the process of one preferred embodiment of the present invention. These figures are self-explanatory and thus are not described in detail herein. However, selected parts of the figures are described below.

FIG. 1A shows the client login process. This process associates specific printer and quote data to the client for use in the comparison steps performed in FIG. 1D.

Figure 1B:
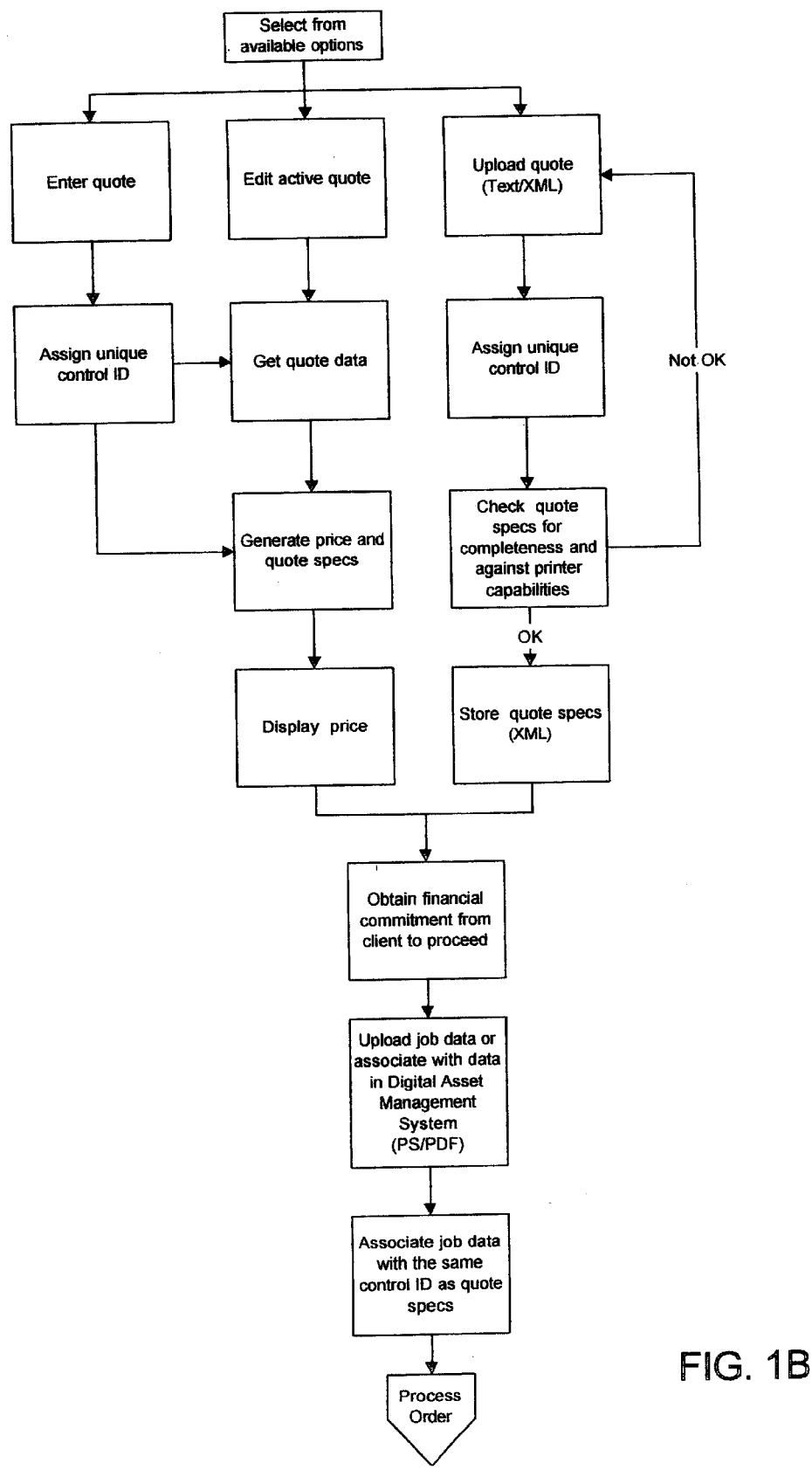

FIG. 1B shows the quotation process. This process generates quotes using conventional print job quotation software (not shown or described) that is executed by a quote engine provided by the online printing company. The local quote engine creates a complete set of quote product specifications for the print job, also referred to herein as "estimate-related specifications." Alternatively, if another quote system is used that is outside of the local process, product specifications must be entered into the system, as a text stream or as an XML document. If a foreign quote system is used, then the imported specifications are checked for completeness and to determine if they are within the capabilities of the associated printer. For example, the size of the requested product cannot be larger than the size that the designated print equipment can produce.

Figure 1C:
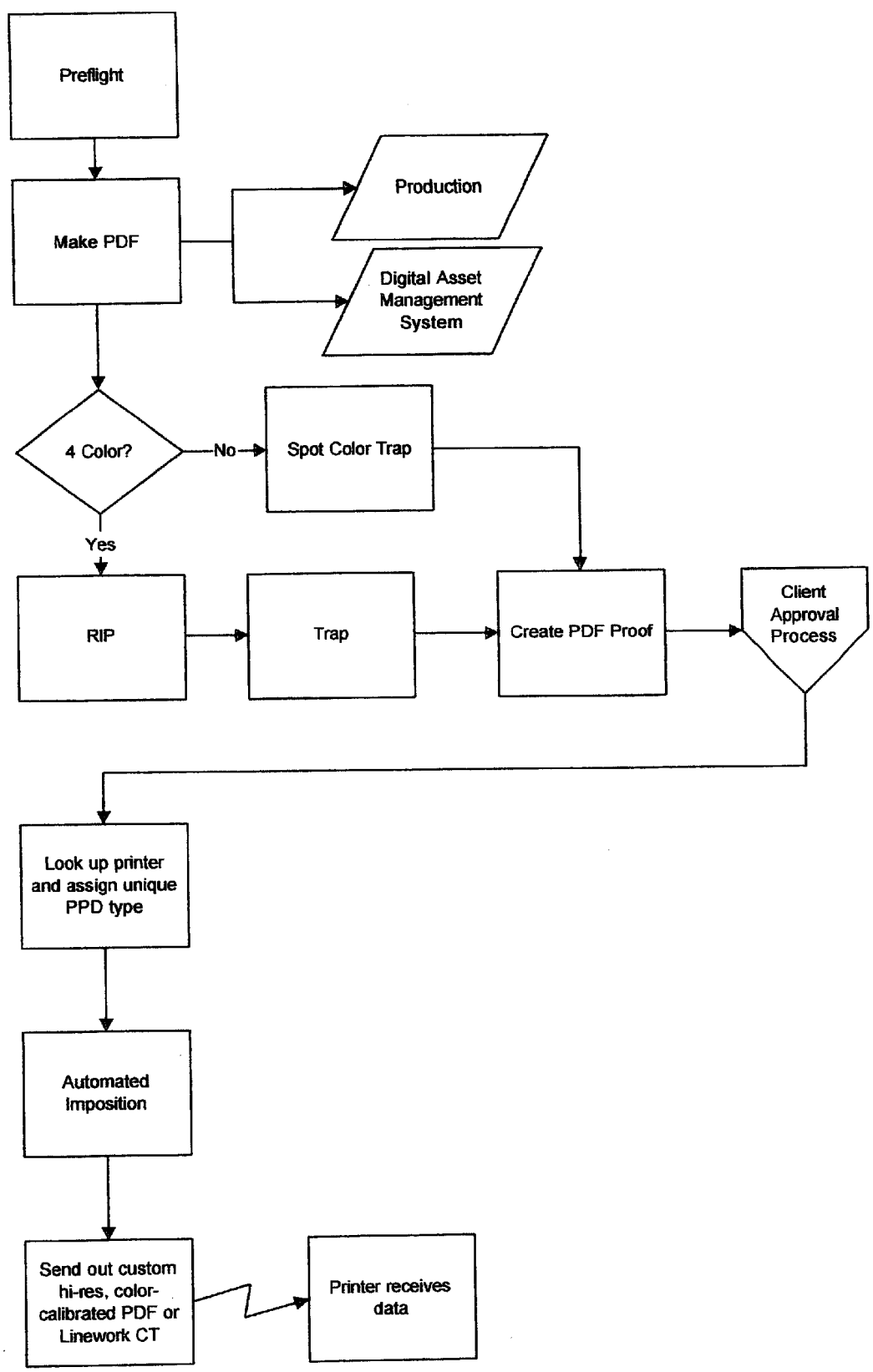

FIG. 1C is a flowchart of the print job order process. The Client Approval Process is shown in more detail in FIG. 1E.

Figure 1D:
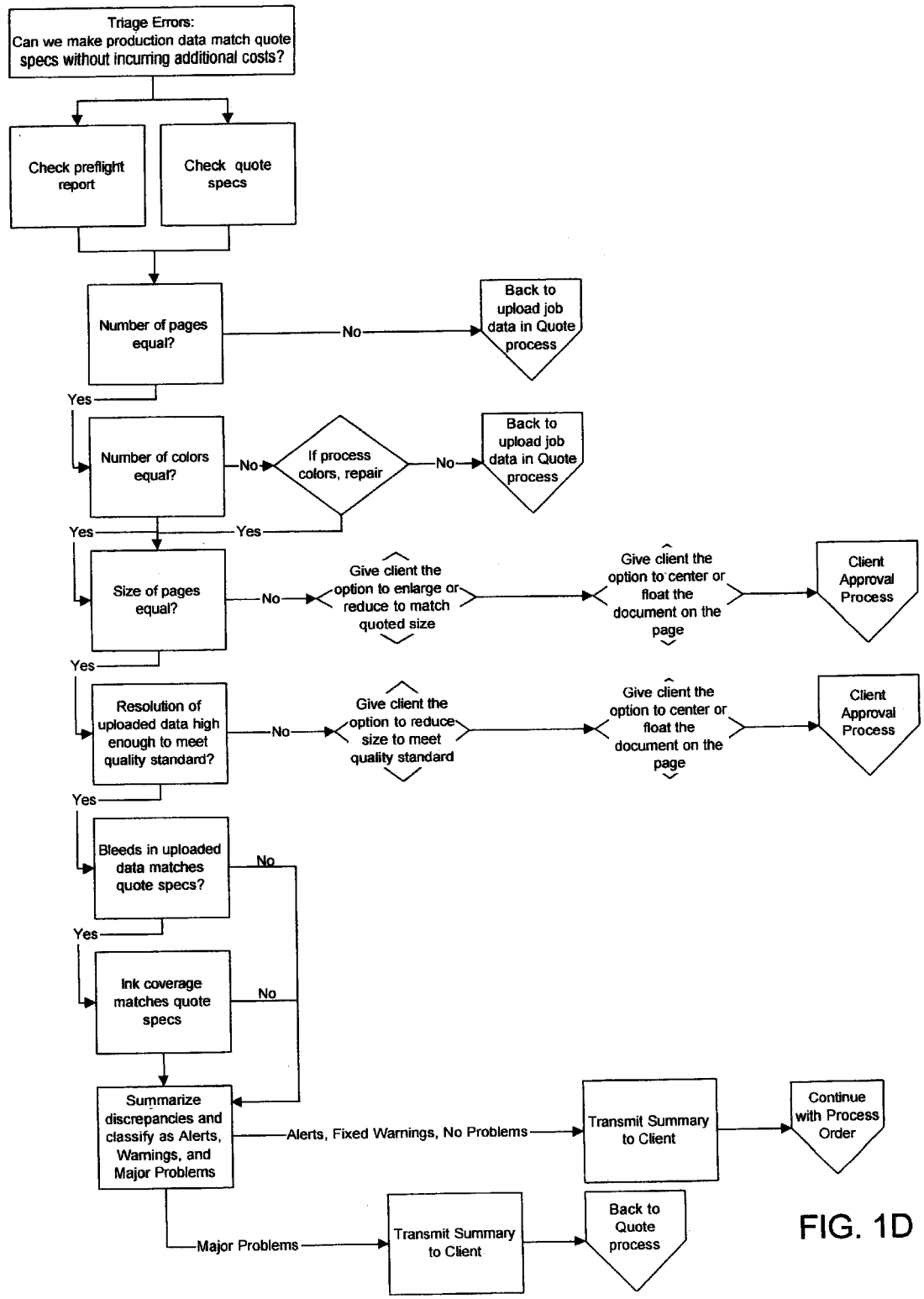

FIG. 1D is a detailed flowchart of the comparison process used to sort out discrepancies between the production data, quote specifications, and printer capabilities and quality requirements. Different actions are taken depending upon the nature of the problem and the correction. All information is collected together and presented to the client as a single report. Problem types fall into three categories:

1. Alert—Automatically fixed a discrepancy. No operator input is necessary.

2. Warning—Client must choose a method of automatic intervention. A user interface is provided for this process.

3. Major problem—Cannot be resolved. Client must fix the problem.

Figure 1E:
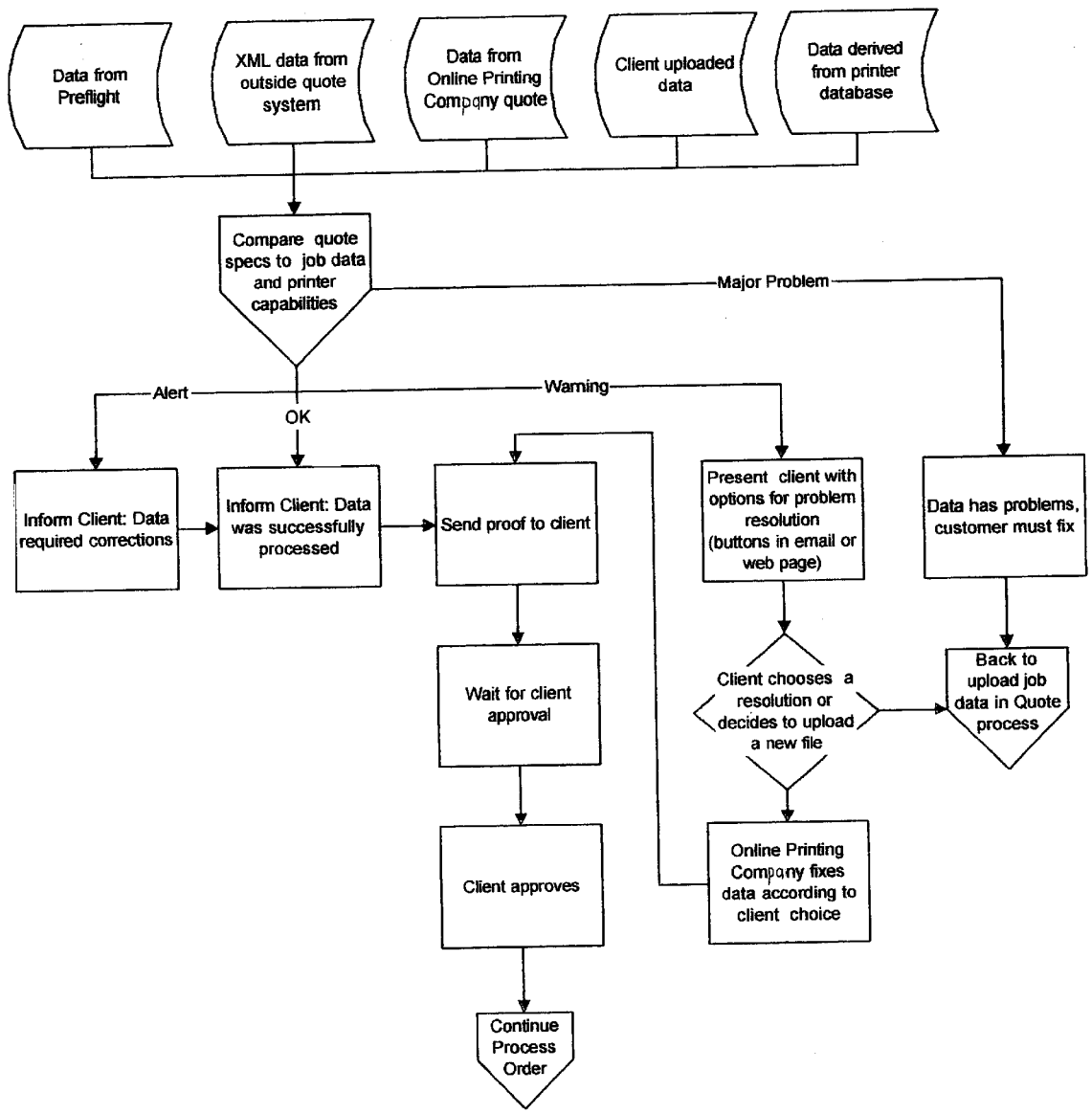

FIG. 1E shows the client approval process. This is the stage where the actual comparison of data from the various sources takes place. If a Warning or Major Problem is encountered, the order is not processed any further until the client resolves the problem and there is agreement between the quote, production data and printer capabilities. In most instances, the online printing company does not intervene in the process. Instead, the client interacts with the system to fix any discrepancies or other problems by revising the quotation, the production data, or both.

FIG. 2 is a high-level hardware architecture block diagram configuration 10 for one preferred embodiment of the present invention. The configuration includes the following elements, interconnected as shown in FIG. 2:

client computer 12 firewall 14 e-mail server 16 printer's computer 18 pre-flight system 20 tape drive back-up system 22

RAID 24 control server 26 with comparison engine therein

RIP 28

SQL server 30 (central data storage)

Ethernet switch 32

The comparison engine is preferably located in the control server 26. However, the functions of the comparison engine may be performed in other elements of the system, if desired.

FIGS. 3A–3D are sample user input and display screens associated with some of the flowchart steps in FIGS. 1A–1E.

Figure 3C:
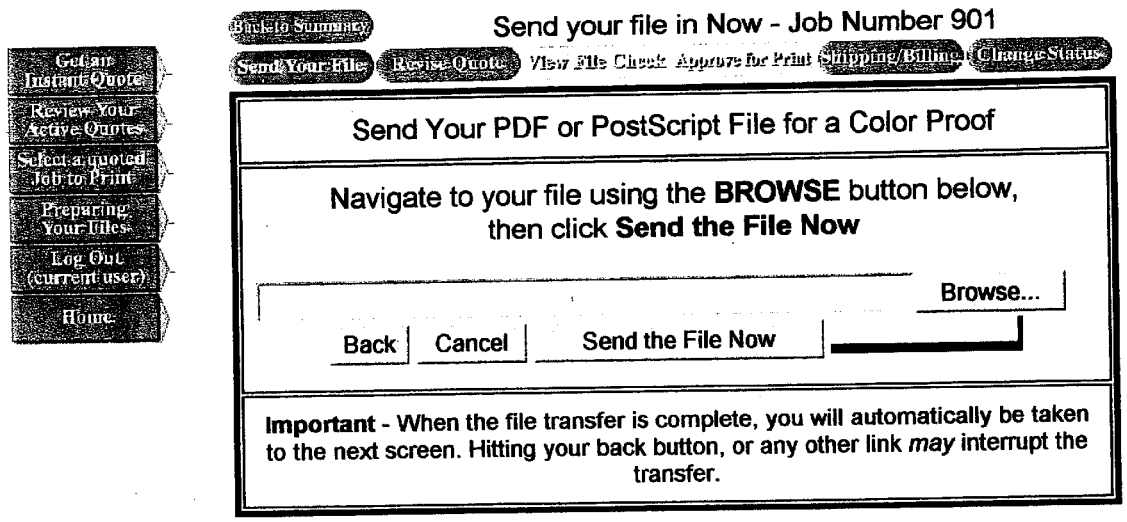

FIG. 3A shows a sample input screen for requesting a quote for flat or folded single printed sheets. FIG. 3B shows a summary page of the print job specifications, as generated by the online printer's quotation engine. FIG. 3C is a sample input screen for inputting an electronic document that contains the actual production data. FIG. 3D is a summary page of the print job specifications as it appears after a quotation is received and saved. Note that the type of printing production equipment to be used in the print job is specified in the quotations shown in FIGS. 3B and 3D.

FIGS. 4A and 4B are sample user input and display screens associated with the print job comparison/checking process of the present invention. The display screens provide conventional preflight report information, as well as comparison information associated with the present invention. In FIG. 4A, the actual uploaded print job specifications failed to compare correctly to the estimate-related specifications. Thus, the print job cannot be completed without corrective action by the client. In this example, the number of pages quoted (one page) does not match the number of pages in the uploaded file (two pages). Other possible concerns are noted, such as that the CMYK total area coverage is too high, and the resolution of the color image is too low for the quoted type of production equipment. The client may also address these concerns, if desired, when revising the estimate and/or the actual print job specifications. In FIG. 4B, the actual uploaded print job specifications compared correctly to the estimate-related specifications. Thus, the print job can be completed if the client selects an approval icon. However, possible concerns are noted, such as that the CMYK total area coverage is too high, and the resolution of the color image is too low for the quoted type of production equipment. The client is given an opportunity to address these concerns, if desired.

FIG. 5 (broken up into parts 1–4) shows the data objects used in the job quote process, the comparison/checking process, and the print production process for performing print jobs.

In one preferred embodiment of the present invention, the client communicates with the comparison software of the online printing company via an electronic network. In one preferred embodiment of the present invention, the client uses a browser to communicate via the Internet with a web site hosted by the online printing company. The online printing company may communicate back to the client via e-mails which may contain relatively simple messages (e.g., "Alerts"), or which may include embedded links to client-dedicated files at the web site of the online printing company to assist the client in responding to "Warning" and "Major Problem" issues, or to link the client directly to a proof of the proposed print job. The scope of the invention also includes other forms of communication with the comparison software, including other forms of electronic networks, and by directly accessing the software via a workstation containing a preloaded version of the comparison software.

The novel and inventive aspects of the present invention may also be used apart from the online printing system. For example, the comparison engine may be inserted as a module into online or automated printing systems of companies other than the company that hosts the comparison engine. Alternatively, the comparison engine may be used as a stand-alone service which may be accessed by a plurality of online or automated printing systems as part of their workflow process. In this embodiment, each of the plurality of systems inputs the appropriate electronic job quote file (containing the estimate-related specifications) and an electronic document containing production data to the comparison engine to perform the discrepancy analysis. If the type of printing production equipment being used for the print job is included in the estimate-related specifications, then the comparison engine also performs the above-described optimization checking functions and the above-described printer job capability checking functions.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated computer-implemented method of comparing a job quote for a print job with production data for a print job that is related to the job quote, the job quote being stored in an electronic file and containing a plurality of estimate-related specifications, the production data being stored in an electronic document, the method comprising:

(a) entering the estimate-related specifications of the job quote file into a comparison engine;

(b) analyzing the production data to determine its actual specifications;

(c) entering at least some of the actual print job specifications into the comparison engine; and (d) in the comparison engine, comparing the estimate-related specifications to the entered actual print job specifications, and outputting any discrepancies therebetween.

2. The method of claim 1 wherein one of the estimate-related specifications is the type of printing production equipment being used for the print job, each type of printing production equipment including a set of optimum performance parameters, the method further comprising:

(e) entering the specification of the type of printing production equipment being used for the print job into the comparison engine; and (f) in the comparison engine, comparing the actual print job specifications to the optimum performance parameters or to a range of optimum performance parameters for the entered printing production equipment, and outputting any actual print job specifications that are not optimum or are not in the optimum range for the entered printing production equipment.

3. The method of claim 1 wherein one of the estimate-related specifications is the type of printing production equipment being used for the print job, each type of printing production equipment including a set of capabilities, the method further comprising:

(e) entering the specification of the type of printing production equipment being used for the print job into the comparison engine; and (f) in the comparison engine, comparing the actual print job specifications to the capabilities of the entered printing production equipment, and outputting any actual print job specifications that are not capable of being met by the entered printing production equipment.

4. The method of claim 1 wherein step (b) is performed by analyzing the production data using preflight software.

5. The method of claim 1 wherein one discrepancy is that the number of pages in the estimate-related specifications do not match the number of pages in the actual print job specifications.

6. The method of claim 1 wherein one discrepancy is that the number of colors in the estimate-related specifications do not match the number of colors in the actual print job specifications.

7. The method of claim 1 wherein one discrepancy is that the size of the pages in the estimate-related specifications do not match the size of the pages in the actual print job specifications.

8. The method of claim 1 wherein one discrepancy is that the bleeds in the estimate-related specifications do not match the bleeds in the actual print job specifications.

9. The method of claim 1 wherein one discrepancy is that the ink coverage in the estimate-related specifications do not match the ink coverage in the actual print job specifications.

10. The method of claim 1 further comprising:

(e) identifying any discrepancies as being an alert type discrepancy, an alert type discrepancy being addressable without any input by a human operator; and (f) automatically addressing any identified alert type discrepancy via print control process software and without any input by the human operator.

11. The method of claim 1 further comprising:

(e) identifying any discrepancies as being a warning type discrepancy, a warning type discrepancy requiring human operator input to address;

(f) displaying at a workstation a plurality of selectable printing job-related choices for addressing any identified warning type discrepancy, and receiving from the human operator one of the selectable choices via the workstation; and (g) automatically addressing the identified warning type discrepancy via print control process software by using the choice selected by the operator without any further input by the human operator.

12. The method of claim 1 further comprising:

(e) identifying any discrepancies as being a major problem type discrepancy that cannot be resolved automatically or by human operator input using the existing job quote and production data; and (f) initiating an electronic job quote process to allow a revised job quote to be prepared that addresses any identified major problem type discrepancy.

13. The method of claim 1 further comprising:

(e) identifying any discrepancies as being a major problem type discrepancy that cannot be resolved automatically or by human operator input using the existing job quote and production data; and (f) communicating instructions to an operator via a workstation display to prepare revised production data that addresses any identified major problem type discrepancy.

14. An automated computer-implemented method of comparing information in a job quote for a print job with production data for a print job that is related to the job quote, the job quote being stored in an electronic file and containing a plurality of estimate-related specifications, the production data being stored in an electronic document, the method comprising:

(a) using the information in the job quote to automatically select the type of printing production equipment being used for the print job, each type of printing production equipment including a set of optimum performance parameters;

(b) entering the specification of the type of printing production equipment being used for the print job into a comparison engine;

(c) analyzing tire production data to determine its actual specifications;

(d) entering at least some of the actual print job specifications into the comparison engine; and (e) in the comparison engine, comparing the entered actual print job specifications to the optimum performance parameters or to a range of optimum performance parameters for the entered printing production equipment and outputting any actual print job specifications that are not optimum or are not in the optimum range for the entered printing production equipment.

15. The method of claim 14 wherein step (c) is performed by analyzing the production data using preflight software.

16. The method of claim 14 wherein step (e) includes comparing the resolution of the actual paint job to the optimum resolution or to an optimum range of resolutions for the entered printing production equipment, and outputting a signal if the actual resolution of the print job is not optimum or is not in an optimum range for the entered printing production equipment.

17. The method of claim 14 further comprising:

(f) identifying any actual print job specifications that are not optimum or are not in the optimum range as being an alert type problem, an alert type problem being addressable without any input by a human operator; and (g) automatically addressing any identified alert type problem via print control process software and without any input by the human operator.

18. The method of claim 14 further comprising:
(f) identifying any actual print job specifications that are not optimum or are not in the optimum range as being a warning type problem, a warning type problem requiring human operator input to address;
(g) displaying at a workstation a plurality of selectable printing job-related choices for addressing any identified warning type problem, and receiving from the human operator one of the selectable choices via the workstation; and
(h) automatically addressing the identified warning type problem via print control process software by using the choice selected by the operator without any further input by the human operator.

19. The method of claim 14 further comprising:
(f) identifying any actual print job specifications that are not optimum or are not in the optimum range as being a major problem that cannot be resolved automatically or by human operator input using the existing job quote and production data; and
(g) initiating an electronic job quote process to allow a revised job quote to be prepared that addresses any identified major problem.

20. The method of claim 14 further comprising:
(f) identifying any actual print job specifications that are not optimum or are not in the optimum range as being, a major problem that cannot be resolved automatically or by human operator input using the existing job quote and production data; and
(g) communicating instructions to an operator via a workstation display to prepare revised production data that addresses any identified major problem.

21. An automated computer-implemented method of comparing information in a job quote for a print job with production data for a print job that is related to the job quote, the job quote being stored in an electronic file and containing a plurality of estimate-related specifications, the production data being stored in an electronic document, the method comprising:
(a) using the information in the job quote to automatically select the type of printing production equipment being used for the print job, each type of printing production equipment including a set of capabilities;
(b) entering the specification of the type of printing production equipment being used for the print job into a comparison engine;
(c) analyzing the production data to determine its actual specifications;
(d) entering at least some of the actual print job specifications into the comparison engine; and
(e) in the comparison engine, comparing the entered actual print job specifications to the capabilities of the entered printing production equipment, and outputting any actual print job specifications that are not capable of being met by the entered printing production equipment.

22. The method of claim 21 wherein step (c) is performed by analyzing the production data using preflight software.

23. An article of manufacture for comparing a job quote for a print job with production data for a print job that is related to the job quote, the job quote being stored in an electronic file and containing a plurality of estimate-related specifications, the production data being stored in an electronic document, the article of manufacture comprising a computer-readable medium holding, computer-executable instructions for performing a method comprising:
(a) entering the estimate-related specifications of the job quote file into a comparison
(b) analyzing the production data to determine its actual specifications;
(c) entering at least some of the actual print job specifications into a comparison engine; and
(d) in the comparison engine, comparing the entered estimate-related specifications to the actual print job specifications, and outputting any discrepancies therebetween.

24. The article of manufacture of claim 23 wherein one of the estimate-related specifications is the type of printing production equipment being used for the print job, each type of printing production equipment including a set of optimum performance parameters, the computer-executable instructions performing a method further comprising:
(e) entering the specification of the type of printing production equipment being used for the print job into the comparison engine; and
(f) in the comparison engine, comparing the actual print job specifications to the optimum performance parameters or to a range of optimum performance parameters for the entered printing production equipment, and outputting any actual print job specifications that are not optimum or are not in the optimum range for the entered printing production equipment.

25. The article of manufacture of claim 23 wherein one of the estimate-related specifications is the type of printing production equipment being used for the print job, each type of printing production equipment including a set of capabilities, the computer-executable instructions performing a method further comprising:
(e) entering the specification of the type of printing production equipment being used for the print job into the comparison engine; and
(f) in the comparison engine, comparing the actual print job specifications to the capabilities of the entered printing production equipment, and outputting any actual print job specifications that are not capable of being met by the entered printing production equipment.

26. The article of manufacture of claim 23 wherein step (b) is performed by analyzing the production data using preflight software.

27. The article of manufacture of claim 23 wherein one discrepancy is that the number of pages in the estimate-related specifications do not match the number of pages in the actual print job specifications.

28. The article of manufacture of claim 23 wherein one discrepancy is that the number of colors in the estimate-related specifications do not match the number of colors in the actual print job specifications.

29. The article of manufacture of claim 23 wherein one discrepancy is that the size of the pages in the estimate-related specifications do not match the size of the pages in the actual print job specifications.

30. The article of manufacture of claim 23 wherein one discrepancy is that the bleeds in the estimate-related specifications do not match the bleeds in the actual print job specifications.

31. The article of manufacture of claim 23 wherein one discrepancy is that the ink coverage in the estimate-related specifications do not match the ink coverage in the actual print job specifications.

32. The article of manufacture of claim 23 wherein the computer-executable instructions perform a method further comprising:
(e) identifying any discrepancies as being an alert type discrepancy, an alert type discrepancy being addressable without any input by a human operator; and
(f) automatically addressing any identified alert type discrepancy via print control process software and without any input by the human operator.

33. The article of manufacture of claim 23 wherein the computer-executable instructions perform a method further comprising:
(e) identifying any discrepancies as being a warning type discrepancy, a warning type discrepancy requiring human operator input to address;
(f) displaying at a workstation a plurality of selectable printing job-related choices for addressing any identified warning type discrepancy, and receiving from the human operator one of the selectable choices via the workstation; and
(g) automatically addressing the identified warning type discrepancy via print control process software by using the choice selected by the operator without any further input by the human operator.

34. The article of manufacture of claim 23 wherein the computer-executable instructions perform a method further comprising:
(e) identifying any discrepancies as being a major problem type discrepancy that cannot be resolved automatically or by human operator input using the existing job quote and production data; and
(f) initiating an electronic job quote process to allow a revised job quote to be prepared that addresses any identified major problem type discrepancy.

35. The article of manufacture of claim 23 wherein the computer-executable instructions perform a method further comprising:
(e) identifying arty discrepancies as being a major problem type discrepancy that cannot be resolved automatically or by human operator input using the existing job quote and production data; and
(f) communicating instructions to an operator via a workstation display to prepare a revised production data that addresses any identified major problem type discrepancy.

36. An article of manufacture for comparing information in a job quote for a print job with production data for a print job that is related to the job quote, the job quote being stored in an electronic file and containing a plurality of estimate-related specifications, the production data being stored in an electronic document, the article of manufacture comprising a computer-readable medium holding computer-executable instructions for performing a method comprising:
(a) using the information in the job quote to automatically select the type of printing production equipment being used for the print job, each type of printing production equipment including a set of optimum performance parameters;
(b) entering the specification of the type of printing production equipment being used for the print job into a comparison engine;
(c) analyzing the production data to determine its actual specifications;
(d) entering at least some of the actual print job specifications into the comparison engine; and
(e) in the comparison engine, comparing the entered actual print job specifications to the optimum performance parameters or to a range of optimum performance parameters for the entered printing production equipment, and outputting any actual print job specifications that are not optimum or are not in the optimum range for the entered printing production equipment.

37. The article of manufacture of claim 36 wherein step (c) is performed by analyzing the production data using preflight software.

38. The article of manufacture of claim 36 wherein step (e) includes comparing the resolution of the actual print job to the optimum resolution or to an optimum range of resolutions for the entered printing production equipment, and outputting a signal if the actual resolution of the print job is not optimum or is not in an optimum range for the entered printing production equipment.

39. The article of manufacture of claim 36 wherein the computer-executable instructions perform a method further comprising:
(f) identifying any actual print job specifications that are not optimum or are not in the optimum range as being an alert type problem, an alert type problem being addressable without any input by a human operator; and
(g) automatically addressing any identified alert type problem via print control process software and without any input by the human operator.

40. The article of manufacture of claim 36 wherein the computer-executable instructions perform a method further comprising:
(f) identifying any actual print job specifications that are not optimum or are not in the optimum range as being a warning type problem, a warning type problem requiring human operator input to address;
(g) displaying at a workstation a plurality of selectable printing job-related choices for addressing any identified waning type problem, and receiving from the human operator one of the selectable choices via the workstation; and
(h) automatically addressing the identified warning type problem via print control process software by using the choice selected by the operator without any farther input by the human operator.

41. The article of manufacture of claim 36 wherein the computer-executable instructions perform a method further comprising:
(f) identifying any actual print job specifications that are not optimum or are not in the optimum range as being a major problem that cannot be resolved automatically or by human operator input using the existing job quote and production data; and
(g) initiating an electronic job quote process to allow a revised job quote to be prepared that addresses any identified major problem.

42. The article of manufacture of claim 36 wherein the computer-executable instructions perform a method further comprising:
(f) identifying any actual print job specifications that are not optimum or are not in the optimum range as being a major problem that cannot be resolved automatically or by human operator input using the existing job quote and production data; and
(g) communicating instructions to an operator via a workstation display to prepare revised production data that addresses any identified major problem.

43. An article of manufacture for comparing information in a job quote for a print job with production data for a print job that is related to the job quote, the job quote being stored in an electronic file and containing a plurality of estimate-related specifications, the production data being stored in an electronic document, the article of manufacture comprising a computer-readable medium holding computer-executable instructions for performing a method comprising:

(a) using the information in the job quote to automatically select the type of printing production equipment being used for the print job, each type of printing production equipment including a set of capabilities;

(b) entering the specification of the type of printing production equipment being used for the print job into a comparison engine;

(c) analyzing the production data to determine its ac specifications;

(d) entering at least some of the actual print job specifications into the comparison engine; and (e) in the comparison engine, comparing the entered actual print job specifications to the capabilities of the entered printing production equipment, and outputting any actual print job specifications that are not capable of being met by the entered printing production equipment.

44. The article of manufacture of claim 43 wherein step (c) is performed by analyzing the production data using preflight software.

* * * * *

UNITED STATES PATENT AND TRADEMARK OFFICE
CERTIFICATE OF CORRECTION

PATENT NO. : 6,801,333 B1
DATED : October 5, 2004
INVENTOR(S) : Mark A. Weiss

It is certified that error appears in the above-identified patent and that said Letters Patent is hereby corrected as shown below:

Column 5,
Line 36, "sprinted" should read -- printed --;

Column 10,
Line 42, "tire" should read -- the --;
Line 56, "paint" should read -- print --;

Column 12,
Line 6, after "comparison, insert -- engine --;

Column 13,
Line 41, "arty" should read -- any --;

Column 14,
Line 39, "waning" should read -- warning --;
Line 44, "farther" should read -- further --;

Column 16,
Line 1, "ac" should read -- actual --.

Signed and Sealed this

Twenty-first Day of February, 2006

JON W. DUDAS
*Director of the United States Patent and Trademark Office*